United States Patent [19]

Gueldenpfennig et al.

[11] 4,228,536
[45] Oct. 14, 1980

[54] TIME DIVISION DIGITAL COMMUNICATION SYSTEM

[75] Inventors: Klaus Gueldenpfennig, Penfield; Charles J. Breidenstein, Rochester, both of N.Y.

[73] Assignee: Redcom Laboratories, Inc., Fairport, N.Y.

[21] Appl. No.: 42,742

[22] Filed: May 29, 1979

[51] Int. Cl.³ .......................................... H04Q 11/04
[52] U.S. Cl. ....................................... 370/66; 370/68
[58] Field of Search ........ 179/15 AT, 15 AQ, 15 BS; 370/66, 68, 100

[56] References Cited

U.S. PATENT DOCUMENTS

| | | | |
|---|---|---|---|
| 3,963,870 | 6/1976 | Couder et al. | 179/15 AT |
| 4,028,495 | 6/1977 | Funamo et al. | 179/15 AT |
| 4,114,143 | 9/1978 | Karnaugh | 179/15 AT |

*Primary Examiner*—Douglas W. Olms
*Attorney, Agent, or Firm*—Martin LuKacher

[57] ABSTRACT

A time division digital communication system which does not require a common control unit for accomplishing interconnections, having a plurality of modular switching units. The switching units are identical and each unit has its own port circuits to which subscriber lines and/or trunks may be connected, service circuits, a time slot interchange and a microprocessor control and timing unit. The switching units are in direct communication via separate send highways, one for the port circuits and the other for the service circuits of each switching unit. The microprocessors of each switching unit are also in direct communication by way of control lines. The inter-switching unit send highways are connected to separate channels or groups of memory locations in the time slot interchanges of each of the switching units. By selective listening to receive highways connected to the output of the time slot interchanges, any port or service circuit, whether in its own switching unit or any of the other switching units, can be interconnected. These interconnections are made under microprocessor control on the basis of events such as off-hook conditions and dialed digits from the ports, rather than by central or call processing. The switching of calls is non-blocking, as any port can be connected to any one or more of the other ports or service circuits at all times.

20 Claims, 10 Drawing Figures

TIME DIVISION DIGITAL COMMUNICATION SYSTEM

DESCRIPTION

The present invention relates to time division digital communication systems and particularly to an electronic switching system having a plurality of modular switching units which are directly connected to each other for the transmission of multiplexed digital data signals and control signals which establish two-way communication between ports associated with each of the switching units.

The invention is especially suitable for use in telephone switching systems or exchanges, such as private automatic branch exchanges (PABX), having from 2 to 256 input/output (I/O) ports.

It is a principal feature of this invention to provide a modular switching system which is application independent and is made up of a plurality of identical modular switching units without the requirement of a common control or general processing unit. The number of lines served by the system can easily be expanded by adding additional modular switching units. The term "line" is intended to include trunks. The system is suited to digital voice transmission, such as PCM (pulse code modulated) or DM (delta modulated) transmission as well as data transmission. Lines carrying digital signals such as from teletypewriters and other data sets or facsimile devices may also be handled by the system.

The time division switching systems which have been proposed are generally intended for use with a large number of lines, in the thousands, and rely upon common control in a central processing unit which serves all of the lines. These central processors may cooperate with preprocessors associated with groups of ports, but nevertheless depend upon a central processor which processes calls which are switched through the system. Such time division switching systems are not cost effective for a relatively small number of lines. They are also expensive since redundancy in the central processing units is necessitated by demands for reliability. A survey of such time division switching systems may be found in Telephone Magazine, Vol. 195, No. 13, Sept. 25, 1978, Page 42. In such systems the lines requiring service, the commonly shared equipment and a free path through the switch must be identified and evaluated in order to establish the transmission path. This involves the processing of calls. Call processing requires large amounts of equipment and signal handling even where a relatively small number of subscriber lines are served by the system. Electronic switching systems have therefore been used principally in central offices and large installations. A typical one of such systems is the Number 4 ESS system which is described in Hobbs "Modern Communication Switching Systems", TAB Books, Blue Ridge Summit, Pa., (1974), Chapter 11 thereof.

It is a feature of the present invention to provide a time division multiplex switching system which avoids the need for call processing of the common control type to supervise connections. Direct connection between ports and the processors of individual switching units in accordance with the invention enables interaction of the switching units on a port basis not on the basis of the nature of the calls, and enables simplification in the handling of control signals as well as avoid the need for a complex data base which accounts for all possible kinds of calls.

It is another feature of the invention to provide modularity in the architecture of the switching system and the units thereof. Each port may be independent while the system provides full duplex transmission between any two ports. The ports may be service circuits as well as ports for lines. The service ports may include tone plant, tone signalling receivers and senders, voice conferencing circuits, and other service features necessary or desirable in telecommunication systems. The service circuits may be distributed among different switching units and each switching unit need not have a duplication of service circuits. Service circuits may be shared by any ports in the system.

It is another feature of the invention that the switching units are not dedicated to any location in the system. Identification of the units is automatically provided without special strapping. Such automatic identification allows allocation of switching units wherever necessary and the addition or deletion of units are required. Similar identification of sections of the system such as printed wiring boards which make up the ports and service circuits is automatically provided in accordance with this feature of the invention, again without the need for special strapping or dedication to particular locations in a unit.

It is another feature of the invention and the architecture of the system is that it is organized for reliability such that the failure of one switching unit does not mean catastrophic system failure, nor does a failure of one switching unit affect the operation of another switching unit.

Briefly described, a time division telecommunication system embodying the invention, which provides two-way communication between a plurality of lines, contains a plurality of switching units, each serving a separate group of these lines. Each of the units has ports interfacing with the lines for receiving and transmitting digital signals, a time slot interchange and a processor unit which also provides timing signals such as clock and sync signals. The switching units are identical modules of the system and each may be referred to as a modular switching unit (MSU). A send highway and a receive highway is located in each MSU. The time slot interchange, processor and ports interface with each other to provide time division multiplex receiving connections for digital signals through the time slot interchange and the receive highway to the ports. The interfacing also provides time division multiplex transmitting connections along the send highway to the time slot interchange. The switching units are in direct communication with each other via control lines which interconnect the processors thereof. The send highways also interconnect the time slot interchanges of all of the MSU's. In the time slot interchanges, separate groups of memory locations are provided for the send highways of each of the MSU's. Common timing signals, which may be generated in one of the MSU's provide for simultaneous writing of the digital signals in corresponding locations of the memory groups. By selectively interconnecting the receive highways in the time slot allocated to the send highways, two-way communication is provided between any port of any of the MSU's in the system.

The foregoing and other features, objects and advantages of the invention, as well as a presently preferred embodiment thereof, will be more apparent from a reading of the following description in connection with the accompanying drawings in which.

Figure 1:
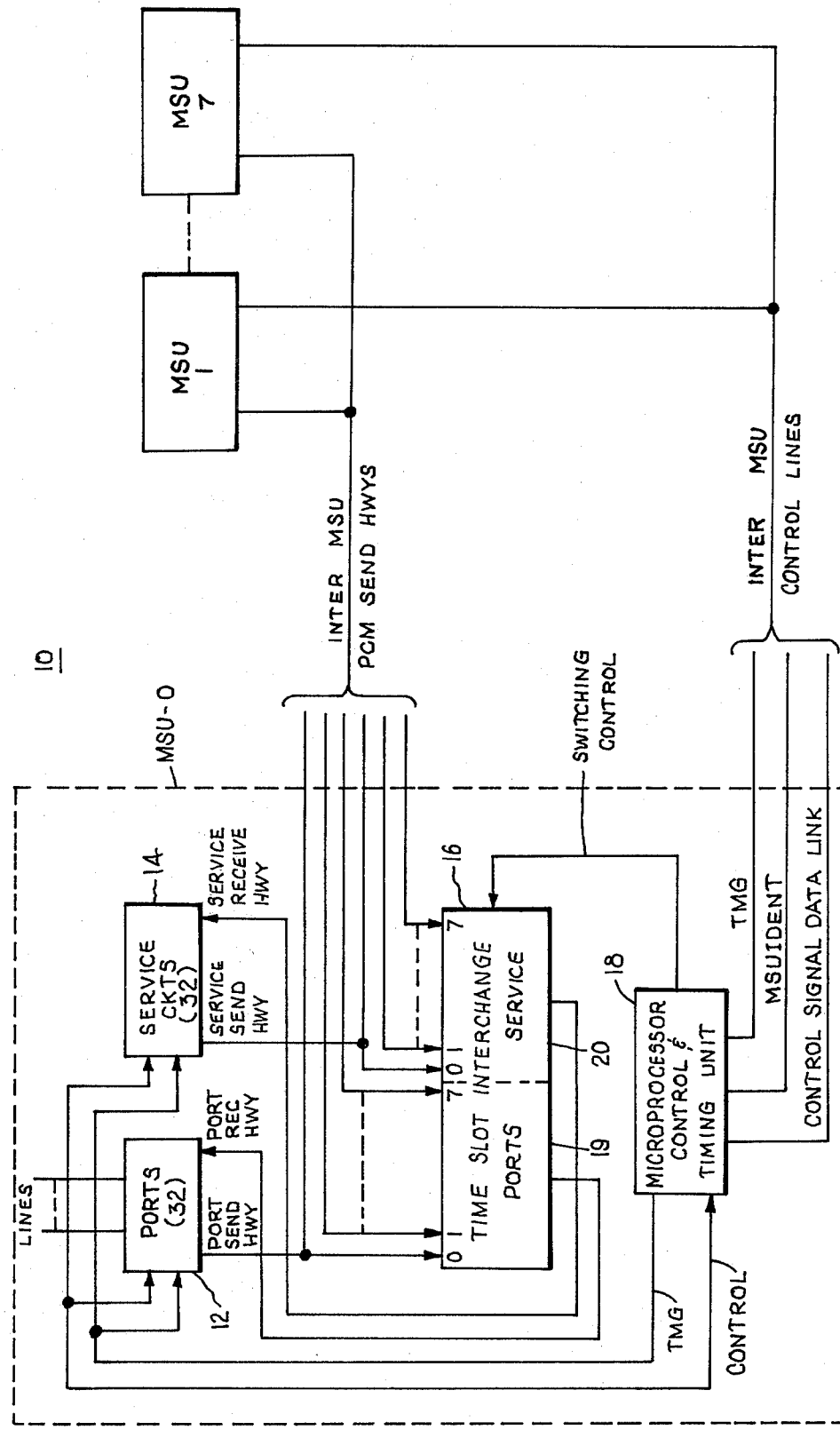
FIG. 1 is a block diagram of a time division multiplexed telecommunication system in accordance with the invention.

Referring to FIG. 1, there is shown an overall view of a time division multiplex telecommunication system 10 embodying the invention. This system is made up of eight modular switching units, MSU-0 and MSU-1 through MSU-7. Each MSU has provision for 32 ports and 32 service circuits. These ports serve 32 lines which may be connected to subscriber sets or trunks. The service circuits are the tone generators, tone signalling receivers and senders, voice conferencing and other service circuits which may be necessary or desirable in a telecommunication system. The system may contain an individual MSU where a small number of lines, 32 or less, is to be served. Two or more MSU's are used in larger systems. The system provides full duplex digital data transmission between ports and service circuits in any combination (i.e., full availability). The switching is non-blocking. There are a maximum of 512 logical ports, 256 of which are system inputs and outputs (I/O's). These are the ports or port circuits 12 of the MSU's. The other 256 available ports are provided for the various service circuits 14. By modular expansion the system, as herein illustrated, may have from 32 ports and 32 service circuits to 256 ports and 256 service circuits.

Each MSU has a time slot interchange 16 and a microprocessor control and timing unit 18. The ports 12, service circuits 14, time slot interchange 16 and microprocessor control and timing unit 18, all interface with each other. Timing signals are outputted by the unit 18 along a timing line to the ports and service circuits 12 and 14 and control signals communicated along control lines between the unit 18 and the port and service circuits provide time division multiplexed data signals along a single port send highway for transmitted data from the 32 ports 12 to the time slot interchange 16. Similarly, a single service send highway between the service circuits 14 and the time slot interchange 16 on which the data signals from the 32 service ports are time division multiplexed is also provided.

The time slot interchange 16 has separate groups of memory locations in separate sections 19 and 20 of the interchange 16 which provide storage for the data signals from the ports 12 and from the service circuits 14, respectively. One of these groups of locations is provided for the storage of data signals transmitted along the port send highway from the ports 12 of the MSU which contain the particular time slot interchange 16. In this case, for MSU-0, this is the group of locations indicated as "0". A similar group of locations in the service section of the interchange 16 is dedicated to the service circuits of this MSU-0. The port send highway is thus connected to the location group "0" in the section of the interchange 16 dedicated to the port data signals, while the service send highway is connected to the group of locations "0" in that portion of the interchange 16 dedicated to the service circuits 14. These locations are in the memory of the interchange 16 and may be provided by two or more memories each having at least 256 locations for the storage of 32 data signal words or bytes for each group of ports 12 and service circuits 14 in each of the eight MSU's. The arrangement of the sections 19 and 20 and the location groups in the memory of the time slot interchange 16 will be discussed in detail below in connection with FIGS. 3 and 4.

In the illustrated system, where eight MSU's are involved, there are at least eight groups of locations, "0" to "7", in the port section 18 of the interchange 16 and eight similar groups of locations in the service section 20 of the interchange. Each of the other MSU's, MSU-1 to MSU-7, have between their ports and port section of their time slot interchanges a separate port send highway. These additional MSU's also have individual service send highways between their service circuits and the service section of their time slot interchanges. In total, there are eight port send highways and eight service send highways. The MSU's are in direct communication with each other via inter-MSU send highways connected to the memory location groups dedicated to the various MSU's. For example, the send highway from MSU-1 is connected to location 1 in the port and service sections of the time slot interchange for MSU-0 and for all of the other MSU's.

The digital signals which are transmitted along these send highways are preferably in PCM code. Other types of modulation such as delta modulation may also be used. The term "digital signal" is therefore intended to comprehend the various types of data signalling formats which are useful in time division switching systems.

The interface between the time slot interchange and the microprocessor control and timing unit 18 also provides for switching control in the time slot interchange 16. Under such control, data signals are selectively received (i.e., selectively listened to) in the time slot allocated to the ports 12 and service circuits 14 with which bi-directional communication is desired. The data signals from the time slot interchange are applied to the ports 12 by way of a port receive highway and to the service circuits 14 by way of a separate service receive highway. These highways are connected through the time slot interchange 16 so that ports can receive from service circuits in the particular MSU (MSU-0) or in any of the other MSU's (MSU-1 through MSU-7). Similarly, service circuits may receive data signals from other service circuits or other ports via the service receive highway. These service circuits and ports which are connected via the service receive highway may be in the particular MSU (MSU-0) or in any of the other MSU's (MSU-1 through MSU-7).

There is direct communication between the microprocessor control and timing units 18 of each of the eight MSU's by way of inter-MSU control lines. Generally, these lines are a timing line (TMG) along which clock and sync signals are transmitted, an MSU identification line (MSU-IDENT) and a control signal data line or link. Inasmuch as each of the MSU's is identical, it may be connected at any position or station along the cable carrying the inter-MSU connections, this cabling may carry both the inter-MSU PCM send highways and control lines. At each of these stations there is a connector. This connector is coded to provide identification codes which are assigned to the MSU's and are used to identify their MSU numbers. In accordance with these numbers the memory groups in the time slot interchanges are allocated. Also allocated are the time slots for the transmission of control signal data long the control signal data link. A single control signal data link can then carry all of the control data for the entire system 10. This identification arrangement will be explained more fully in connection with FIG. 8.

Timing signals are provided by a generator of such signals in the units 18 of each of the MSU's. Only one such generator is used at a time. The system switches over between successive MSU's, in case of a failure of a timing signal generator. There are therefore eight available timing signal generators for the purpose of generating timing signals which greatly enhances the reliability of the system 10. The timing signal generation and distribution system used in the switching system 10 is described more fully in a patent application (Ser. No. 42,743) filed concurrently herewith in the names of Charles J. Breidenstein, Jerome S. Caplain, and Bruce Littlefield, and assigned to the same assignee as this application.

Figure 2:
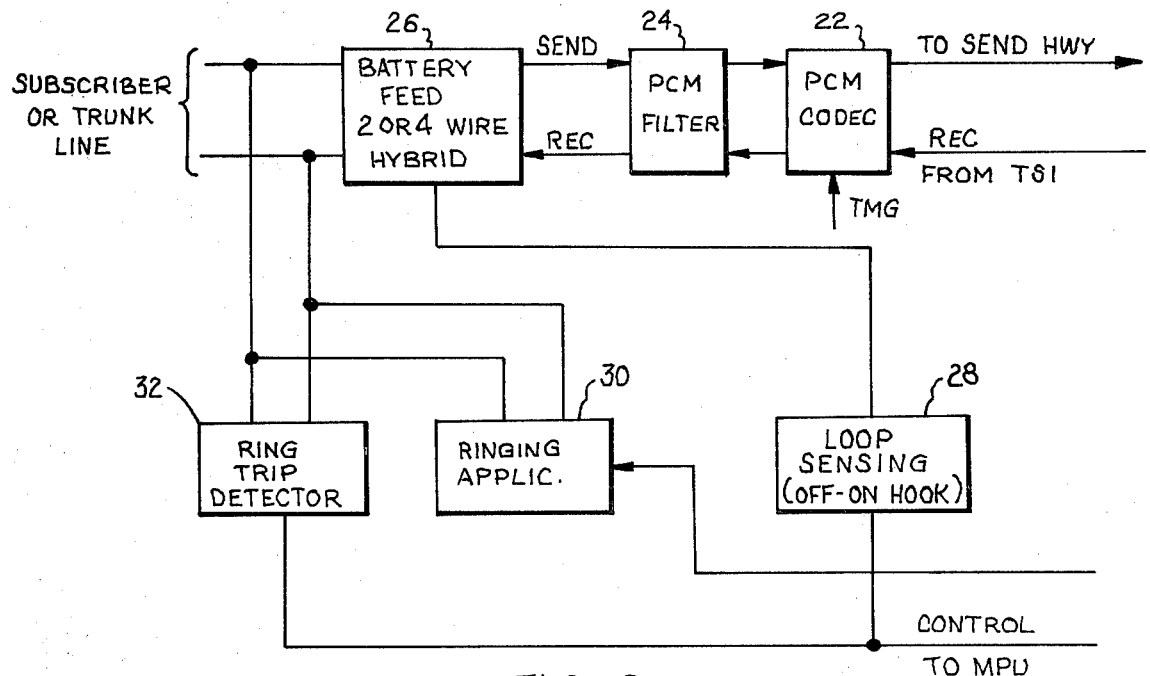
FIG. 2 is a block diagram showing the circuits of one of the ports in one of the MSU's of the system shown in FIG. 2.

Referring to FIG. 2 there is shown a typical port circuit associated with one of the lines connected to the ports 12 of one of the MSU's. The service circuits are similar to the extent that a PCM codec 22 is used and is interconnected to the send and receive highways to and from the time slot interchange. The time slot allocated to the port is dictated by the timing signal applied to the codec. This timing signal may be derived from a Gray code containing five bits which uniquely identifies the one of the 32 time slots which is allocated to the port. The Gray code generation, while part of the control function, is for convenience in enabling the use of related components mounted on the board with circuits which perform the time slot interchange function and will be described hereinafter in greater detail in connection with the description of FIG. 4 which shows the time slot interchange.

The codec 22 contains analog to digital converters and digital to analog converters which translate analog voice signals into PCM digital signals and apply it to the send highway. similarly digital to analog converters in the codec 22 translate PCM and digital signals into analog signals, such as voice signals. The codec may for example be of the type available from Motorola Semiconductor Products, Inc., their type MC-14407.

PCM filters 24 confine the bandwidth and amplitude of the signals to the range which is handled by the codec 22. The signals sent through the filters are conceptually on four wires, although one wire may be common, for the send and receive sides of the transmission. This four-wire transmission is converted from a two-wire transmission which is provided by the subscriber line by a conversion circuit which may be a two-wire to four-wire hybrid 26, which also provides battery feed to the subscriber set connected to the line.

Connected to the hybrid are a loop sensing circuit 28 which detects on and off-hook conditions at the subscriber set and circuits 30 and 32 for the application of ringing signals and for ring trip detection. The ringing application may be from a ringing generator. Control signals from the loop sensing and ring trip detector circuits are connected by way of control lines to the microprocessor control and timing unit 18 of the particular MSU. These control lines may also include a line for ringing application. These control lines are as shown in FIG. 1 and FIG. 4 derived from the microprocessor 18. The circuits 26, 28, 30 and 32, may be part of a subscriber loop interface circuit. This circuit may consist of integrated circuits such as are available from Motorola, their Parts MC-3419L, MJE-270 and MJE-271, and MDA-220.

In the codec 22 there are registers containing the PCM signals which are to be transmitted to the send highway and are received from the time slot interchange along the receive highway. In the time slot allocated to the port as denoted by the timing signals, the PCM signals are read out of the register to the send highway and are written in from the receive highway into the register for the signals to be received.

Figure 3:
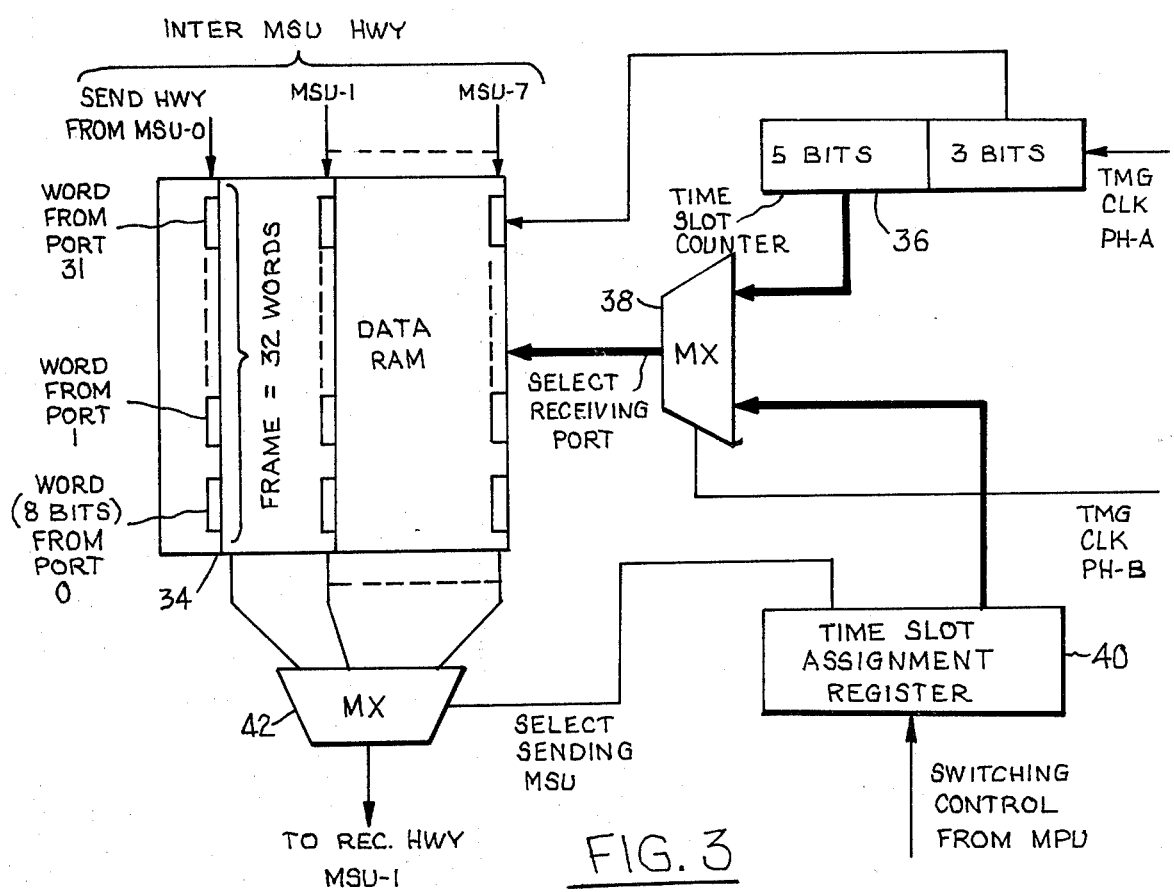
FIG. 3 is a simplified block diagram which depicts generally the operation of the time slot interchange on one of the MSU's in the system shown in FIG. 1.

The signals from the send highway are transferred to a group of locations or channel of the memory of the time slot interchange which is dedicated to the particular MSU. One section of this memory which contains the data signals, for example from the port send highways of the MSU's may be a data RAM (random access memory) 34 shown in FIG. 3. FIG. 3 is a simplified diagram of the time slot interchange. It presents only one section of the time slot interchange memory to facilitate the description of the principles of operation of the time slot interchange. The data RAM 34 in each of the eight channels or groups of locations thereof is dedicated to the send highway from a different MSU. MSU-0 has the first of these groups of locations for the first channel, while MSU-7 has the last, as visualized in FIG. 3.

Each channel has 32 locations in which a frame of 32 words or bytes is stored. The first word is stored in the first or bottom-most location and is the word from the first port, port —0. The last word comes from port —31. Words from corresponding ports in each MSU are stored simultaneously. The words from port 0 of all the MSU's are all stored simultaneously in the first of the 32 locations. The words from port 1 are all stored simultaneously in the next location and in the next time slot and so forth until the end of the frame at which time the word from ports 31 of each of the MSU's will be stored simultaneously during the time slot allocated to the last port and in the last location in the data RAM 34. Each of these words are multibit words and may for example consist of eight bits.

A time slot counter 36 which is an eight-bit counter counts one phase of the timing clock. The timing clock may be a square wave of 50% duty cycle. The first phase of the clock (e.g., PHA) is represented by the leading or positive-going edge of the clock pulse, while the second phase of the clock (e.g., PHB) is represented by the trailing or negative-going edge of the clock pulse. The first three bits of the output of the counter determine the location of each of the bits of each of the words stored in the data RAM. The last five bits of the counter determine the word locations. The PHB clock operates a switch 38 which selects between the five-bit output from the counter 36 and a similar five-bit output from a time slot assignment register 40. The selector switch 38 as well as other selector switches in the system are all indicated symbolically by the letters MX in a trapezoidal block.

The time slot assignment register 40 receives signals along the switching control lines from the microprocessor section of the unit 18 and stores the time slot of the receiving port and the MSU number of the sending port therein. The switching control and operation of the time slot assignment register 40 will be explained more fully in connection with FIG. 4.

Another switch 42, which is controlled by the contents of that portion of the register 40 which selects the sending MSU, is connected to that portion of the register 40 which contains the identification of the sending MSU. At the time of the PHB clock, the address of the port and of the sending MSU are transmitted via the switch 38 and to the switch 42. The allocation of the time slots in the register 40 and in the counter 36 are synchronous and coherent with each other since they are derived from the same clock and synchronized by the same sync signal which arrives at the end of a frame. Accordingly, when the data RAM 34 is read out it will be read out in the time slot allocated to the receiving port. The address which is read out from the register 40 may be the address of any port in the same MSU as that in which the receiving port is located or in any other MSU; thus enabling bidirectional communication between any two ports, and even simultaneously to multiple receiving ports from one sending port. As will be explained more fully in connection with FIG. 4, not only ports but service circuits of any of the MSU's may be interconnected by means of the time slot interchange by providing pairs of locations or channels in memory of the interchange for the port and service send highways of each MSU.

Figure 4A:
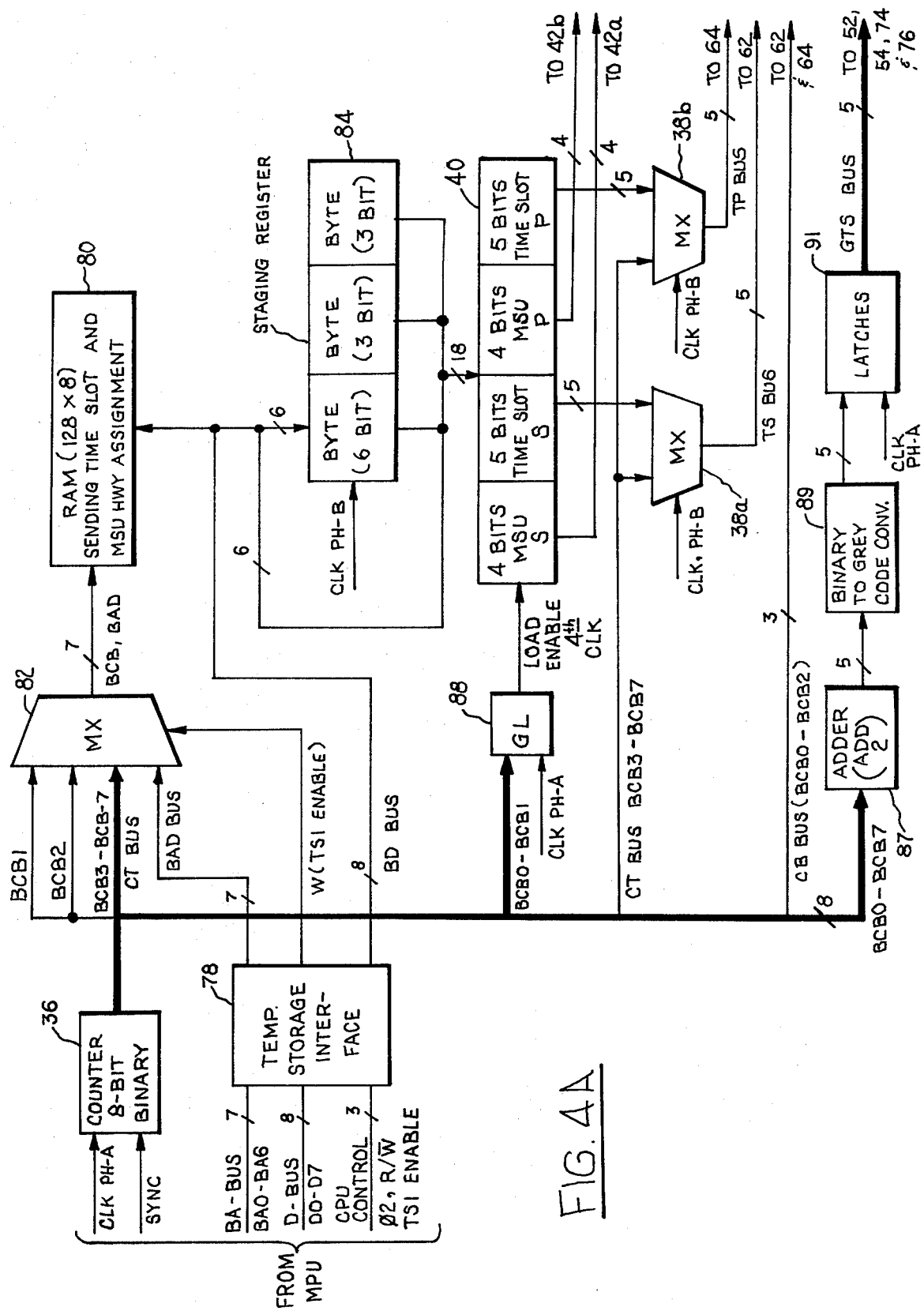
FIG. 4 (A and B) is a more detail block diagram of the time slot interchange with its associated equipment.
Figure 4B:
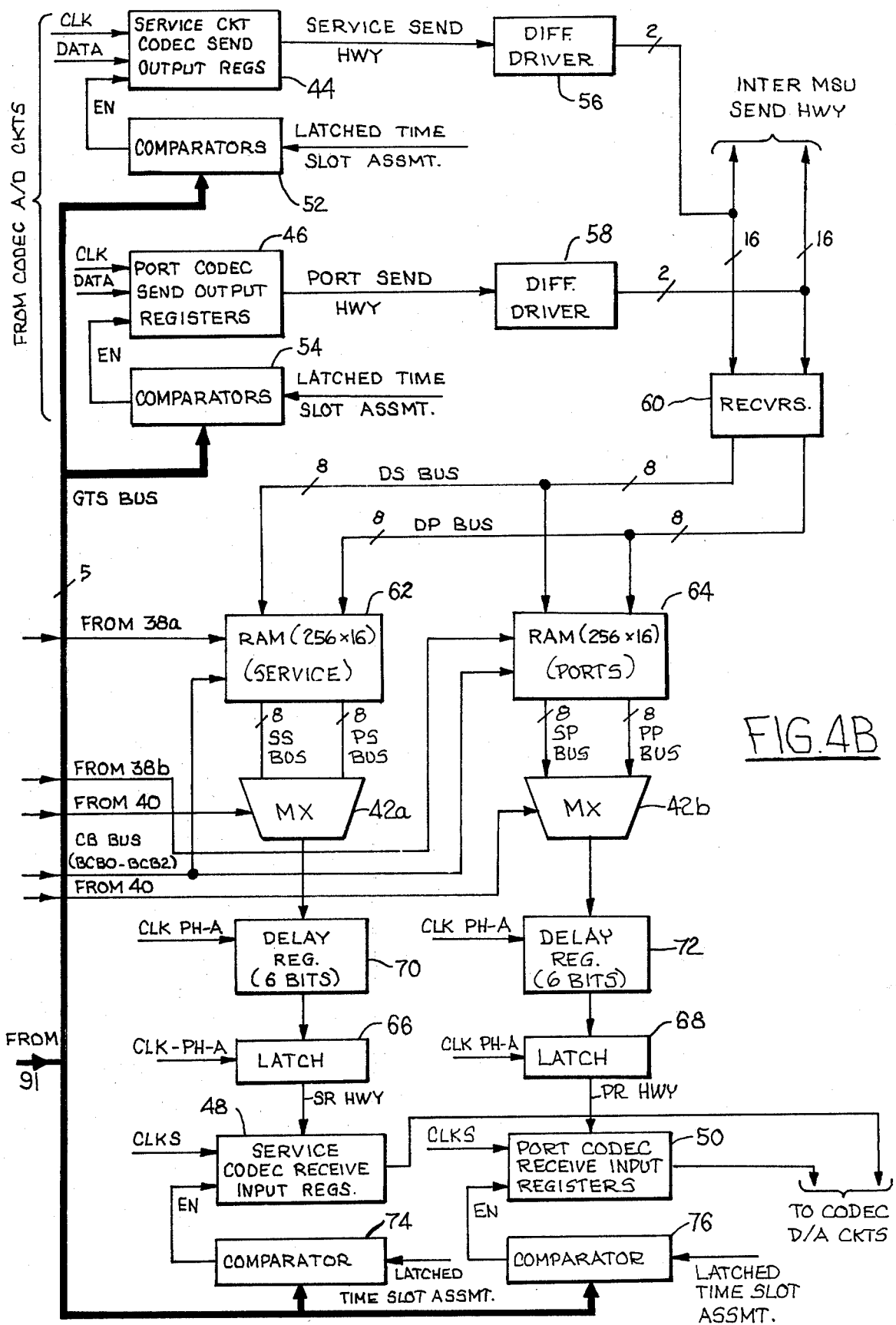

Referring to FIG. 4, there is shown, in addition to the time slot interchange 16, the service circuit codec send output register 44, the port codec send output registers 46, the service codec receive input registers 48, and the port codec receive input registers 50 (see FIG. 4B). The send registers 44 and 46 receive input data and clock pulses from the analog to digital converters of their respective codecs and transmit the data signals along the service send highway and the port send highway of the particular MSU. The time slots for transmission from each of the send registers of the 32 codecs associated with the service circuits and the 32 codecs associated with the port circuits is determined by a five-bit signal on the Gray code bus (GTS BUS). This bus is connected to comparators 52 and 54 associated with each of the service circuit codec send output registers 44 and the port codec output send registers 46.

The comparators are assigned time slot identification signals in Gray code upon initialization of the system. The assignment upon initialization is made possible by board position identification code signals obtained from lines on the back plane of the main frame into which the printed wiring boards containing the port and service circuits are inserted. These lines are connected to connectors, thus the port and service circuit boards may be inserted at various locations in the main frame. Modularity is maintained even down to the port and service circuit boards. A MSU need not be equipped with all 32 port and service circuits and any port and service circuit board may be used and connected independently to any connector in any slot in the main frame for port and service circuits.

As will be described in connection with FIG. 6, the registers 44 and 46 are connected via the data bus to the microprocessor (MPU) of the processor and timing unit 18 upon initialization of the system 10, i.e., when power is turned on to start up the system, and the data representing the time slots assigned to the various port and service circuit (the time slot identification signals) is transmitted from the MPU and stored in the registers of the port and service circuits so that each port and service circuit codec will be addressed and allocated to a successive, unique, and preferably a one of the 32 time slots in each frame.

The service send highway and the port send highway are transmitted to the inter-MSU send highway through differential drivers 56 and 58. The inter-MSU send highway is a differential pair in order to improve noise rejection characteristics and prevent power offsets which may occur in the different MSU's. The differential drivers also are tri-stated, that is their outputs go to a high impedance state when a particular MSU is powered down, as when a failure occurs.

There are eight pairs of service and eight pairs of port inter-MSU send highway lines. The 16 MSU service send highway lines and the 16 inter-MSU port send highway lines are connected to differential pair receivers 60 which distribute the differential pairs on an eight-conductor DS BUS and on an eight-conductor DP BUS. These buses are connected to the data input lines of two data RAMS 62 and 64 which are allocated to the service receive highway and the port receive highway of the MSU, respectively. These RAMS have 16 groups of 256 bit locations each. These 256 bit locations provide storage for the 32 eight-bit words which constitute a frame of the time division multiplex data signals which are transmitted along the inter-MSU send highways. The data signals are written into the RAM's 62 and 64 by address signals obtained from an eight-bit binary counter 36 and from an assignment register 40 through switches 38a and 38b as was explained generally in connection with FIG. 3 and will be explained in greater detail hereinafter (see FIG. 4A).

The data signals are read out of the service RAM 62 on an eight-conductor SS BUS which is connected to the groups of locations to which service data signals are applied via the DS BUS. An eight-conductor PS BUS carries readout data signals from the groups of locations which store the port data signals from the DP BUS. Similarly the port RAM 64 has an eight-conductor SP BUS and an eight-conductor PP BUS on which readout data signals from the port circuits and the service circuits are respectively applied (see FIG. 4B).

These signals are read out of the latches into selector switches 42a and 42b which function similarly to the selector switch 42 described in connection with FIG. 3. These switches 42a and 42b are operated by data stored in the assignment register 40 and select the data signals in the time slot of a sending or calling port or service circuit to the send receive highway and the port receive highway via six-bit shift registers 70 and 72 which provide a delay of six bit-times. Latches 66 and 68 provide buffering for timing purposes. The generation of the signals on the GTS BUS is so timed with respect to the delays in the handling of the data signals in the time slot interchange 16 so that corresponding send and receive time slots are in time synchronism with each other. The send and receive time slots are one time slot (the period of eight clock pulses) apart for convenience in data handling in the codecs. The manner in which the Gray code is effectively advanced so as to provide for this one time slot difference between the send and receive time slots will be explained below.

The Gray codes from the GTS BUS are also applied to comparators 74 and 76 associated with the service codec receiving input registers 48 and the port codec receiving input registers 50. The time slot identification signals which are assigned during initialization, and which assignment is made possible by the board position codes, determine the time slots when the input registers 48 and 50 are enabled to receive the data signals from the service receive and port receive highways SR HWY and PR HWY in their allocated time slots. The data signals are then translated by the digital to analog converters of the codec into voice or other analog signals which are used in the port and service circuits and applied to the lines associated with the port circuits.

It will be seen that the service RAM 62 provides connections from any service or port send highway and to the service ports of the MSU. Similarly the port RAM 64 provides to the port receive highway and port circuits of that MSU any data from any port or service circuit of any of the MSU's. The service and data ports are therefore totally independent and the switching network is non-blocking. Although a single RAM instead of a pair of RAM's 62 and 64, as shown, may be used if the memory cycle in the RAM were to be carried out in a shorter period of time, it is presently preferred to use the pair of RAM's 62 and 64 for the purposes of providing non-blocking and independent switching between the ports and service circuits.

The writing of the data signals into the RAM's 62 and 64 and the reading out of the data signals in the appropriate time slots from a sending port or service circuit to the receiving port or service circuit in communication therewith is controlled by the counter 36, the assignment register 40 and their associated circuits (see FIG. 4A). The counter 36 is an eight bit binary counter which is reset by every sync pulse which occurs at the end of the frame and counts the clock pulses. The data rate may for examples be 64 K bits per second per port such that the data rate on the highway is 2.04 M bits per second on the highways, since 32 ports and service circuits are multiplexed onto the highways.

As indicated above, each processor has timing signal generating means which may for example be a crystal clock oscillator. A divider divides the clock rate of 2.048 MHz by 256 to obtain the sync rate. The counter has eight outputs BCB0 to BCB7. The switching control lines from the processor unit are seven parallel address bits BA0 and BA6 which appear on a seven-conductor buffered address bus (BA-BUS). Also the processor provides an eight-bit data word consisting of bits D0 and D7 which appears on an eight-conductor data bus (D-BUS).

Three control signals appear on a CPU control bus. These are the phase two ($\phi 2$), R/$\overline{\text{W}}$ and the TSI enable signals. $\phi 2$ appears when the data on the D-BUS is valid. The R/$\overline{\text{W}}$ is normally of a level to enable reading from a memory RAM. The TSI enable is present only when the processor is communicating with the time slot interchange for purposes of setting up or releasing a connection. These control lines are connected to a temporary storage interface unit 78 which contains latches providing temporary storage for the addresses BA0 to BA6 and the data D0-0 to D0-7 on occurrence of a TSI enable.

Figure 5:
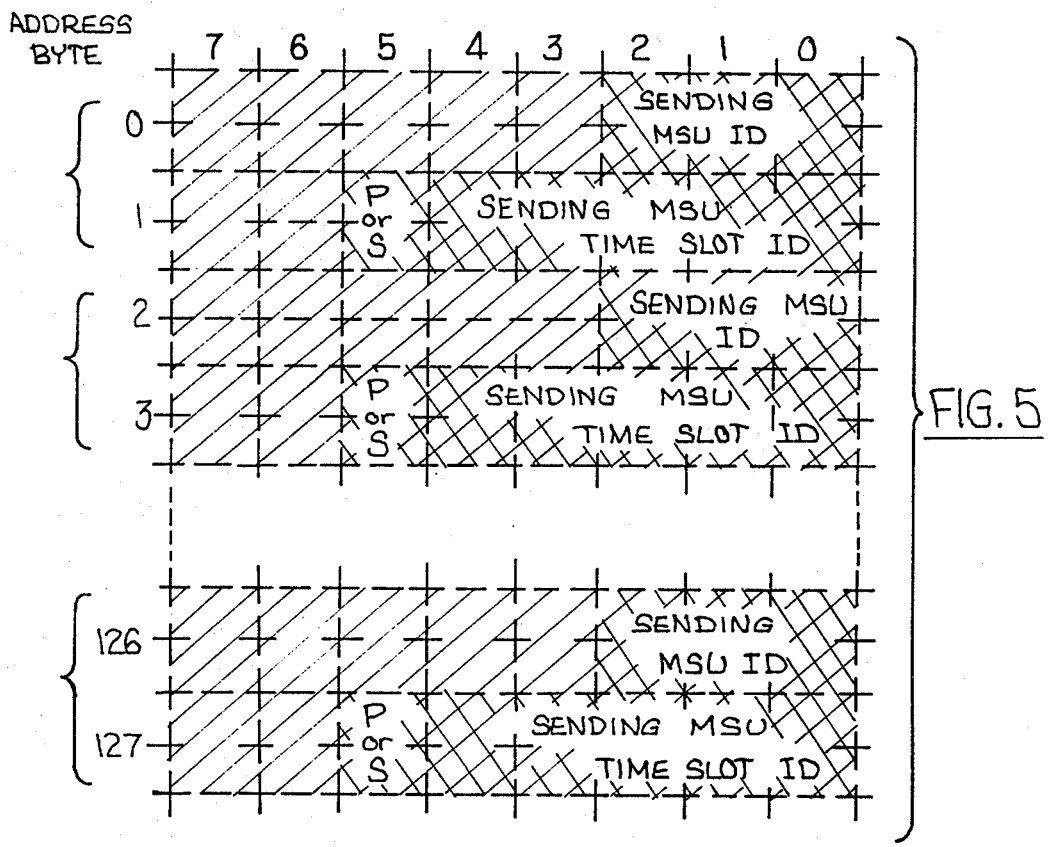
FIG. 5 is a map of the contents of the sending time slot and MSU highway assignment memory of the time slot interchange shown in FIG. 4.

The data bytes D0 to D7 are read out of temporary storage in the interface 78 on a BD BUS to a RAM 80. This data represents the MSU highway assignment and the time slot of the sending port or service circuit. Nine bits are necessary to identify which of the 512 ports or service circuits in each of the eight MSU's are sending. These bytes are stored in the RAM as two consecutive bytes for each of the 32 ports and each of the 32 service circuits which may be receiving for a total of 128 bytes. The memory map of the RAM 80 is shown in FIG. 5. The nine bits which identify the sending port are contained in two eight-bit bytes. In the first byte a field of the three lowest bits are used and in the second byte a field of six bits are used. The sending MSU identification number (one out of eight) is identified by the three bits of the first byte. The first five bits of the second byte identify which of the 32 time slots is used by the sending MSU. The sixth byte identifies whether a port or service circuit is sending.

The arrangement of the data in the RAM 80 preferably directly matches the organization of the service circuits and ports, with 64 locations for the 32 service circuits assigned to half of the RAM 80 and 64 locations for the 32 ports assigned to the other half of the RAM. The assignment may be varied by changing the sequence of the data bits D0–D7 from the processors.

In the event that no port or service circuit is sending in a time slot allocated to a port or service circuit of the particular MSU, the data written into the RAM 80 in the appropriate location for that time slot represents a silent tone. This may be the address of a service circuit in one of the MSU's which is not being used in the system.

The address BUS from the MSU (the BA-BUS and the BAD BUS) identify the address in the RAM 80 for the sending port or service circuit. The addresses from the counter 36 and from the address buses both contain seven bits. The counter bits are arranged on a CT BUS which has five conductors for the five highest order bits from the counter 36 (BCB3–BCB7). The last two bits of the RAM 80 address from the counter 36 are the lowest and next to the lowest order bits of the eight counter bits and are the BCB0 and BCB1 bits. BCB0 and BCB1 determine that two successive bytes are stored in the different halves of the RAM 80 locations and they are wired or strapped as the highest and lowest order bits respectively in the address code of seven bits which is applied to the RAM 80. Accordingly, as the counter is advanced through the 128 locations in the RAM 80, locations 0 and 1 will first be addressed, then locations 64 and 65, then locations 2 and 3, then locations 66 and 67, and so forth until the entire frame is covered.

The addresses from the counter 36 or the addresses on the BAD BUS are applied to the address inputs of the RAM 80 through a selector switch 82. When the MPU is accessing the time slot interchange (which occurs when the MPU data representing the receiving ports is to be written into RAM 80) this selector switch 82 counts the BAD BUS to the RAM 80. In the read condition, the switch 82 supplies the addresses from the counter address lines to the RAM 80 and the data signals will be read out one byte at a time into the first stage of a four-stage staging register 84. The addresses on the counter lines are organized so as to select bytes in order, first from the group of 64 locations on one side of the RAM 80 and then from the group of locations to the other side of the RAM 80. These locations are read out in sequence and synchronously with the occurrence of the time slots.

The staging register 84 is made up of groups of latches (a group of 6 followed by two groups of three). Data is shifted in a pipeline manner between adjacent groups of latches every clock pulse. Consecutive bytes from alternate halves of the RAM 80 are then advanced in pipeline fashion along the staging register.

After the fourth clock pulse a new set of sending port and service circuit data will be stored in the staging register. Gating logic 88 gates out the fourth clock pulse. The lowest order counter bits BCB0, BCB1 and BCB2 and the clock pulse are applied to the logic 88. The clock pulse occurring after a count of three corresponds to the fourth clock pulse and enables the data in the staging register to be loaded into the assignment register 40.

The assignment register 40 only receives the field of the bytes in the staging register which contain the data signals. Also the last byte read-out of the RAM 80 goes to the assignment register 40, resulting in two groups of bits for the ports and service circuits which are to receive the transmitted data signals. The port group contains the five-bit sending MSU time slot identification followed by four bits, one of which is the port or service circuit designation bit and three bits constitute the sending MSU identification number. There are a similar five-bit group of locations and a four-bit group of locations for the service circuits in the register 40.

There is available in the assignment register 40, the addresses of the data signal in the data RAM's 62 and 64 which are sending. These addresses are applied alternately with the addresses for writing in the data signals into the RAM 62 and 64 through the selector switches 38a and 38b. These switches serve the same function as the selector switch 38 which was described in connection with FIG. 3. The addresses of the individual bits both for writing and reading with respect to the RAM's 62 and 64 are the same and are obtained from the CB BUS which carries the three lowest order bits from the counter 36. The five bits which address the time slot locations for writing are obtained from the CT BUS and are applied alternately with the time slot address bit of the sending ports from the five-bit stages of the assignment register 40 via the switches 38a and 38b of the RAM's 62 and 64. The read/write control input to the RAM's 62 and 64 is omitted for simplification.

It will be appreciated that these signals alternate twice each clock pulse cycle. The address signals are applied to the address signals of the service data RAM 62 via the TS BUS and to the address inputs of the port data RAM 64 via the TP BUS. The time slot interchange thus recognizes a one-way connection to a receiving port or service circuit therein. A two-way or duplex call set up requires two independent actions by the same time slot interchange in case of connections between ports and service circuits of a particular MSU or the time slot interchange of another of the MSU's. It will be noted that no action is required by the time slot interchange associated with a port or service circuit in another MSU. This permits a number of receiving ports to listen to any one sending port. This obviates the need for multiple sources of tones, since one source can supply all ports.

The four-bit stages of the assignment register control the selector switches 42a and 42b (see FIG. 4B). These switches function in the same way as the switch 42 as described in connection with FIG. 3. Only one of the sixteen SS and PS BUS lines coming from the latches 66 is selected by the switch 42a. Only one of the sixteen SP and PP BUSES is selected by the switch 42b. Accordingly, the service receive highway (SR HWY) and the port receive highway (PR HWY) can both handle data signals simultaneously. Sending ports can communicate with receiving ports or service circuits and sending service circuits can also communicate either with receiving ports or service circuits. The system is therefore non-blocking.

Now consider the generation of the Gray code signals on the GTS BUS. An adder 87 containing combinational logic adds a numerical value of 2 to the numerical value of the 8-bit number from the counter 36 which is applied to the adder 87 (see FIG. 4A). This provides an advance of the count, but adds to the least significant bits. The five-bit time slot number on the CT BUS advances two clock pulses earlier than counter 36. This simulates the use of a counter which runs slightly ahead of the counter 36. The adder supplies, on a counter time slot advance bus, the five higher order bits to a binary to Gray code converter 89. The Gray code obtained from the converter 89 is latched for one clock period in a set of latches 91 and establishes a code which is effectively one time slot advanced from the time slot of the data signals which arrive over the receive highways to the service codec receiving input registers 48 and the port codec receiving registers 50. Inasmuch as there is a one-time slot delay in the time slot interchange, the advance of one time slot is compensated for by the delay and the timing of the receiving of the data signals with the transmission thereof, is maintained throughout the system.

Figure 6:
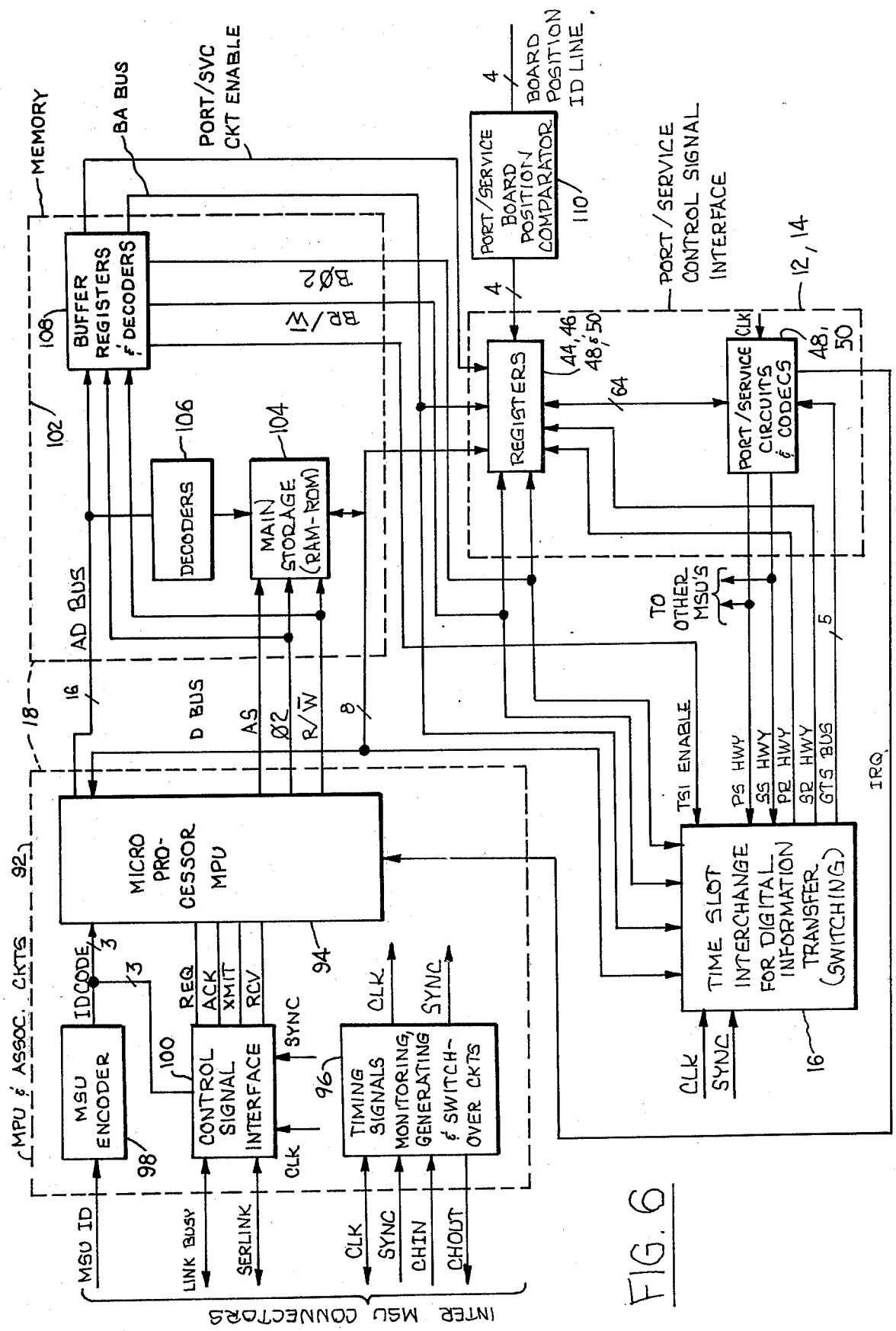
FIG. 6 is a block diagram of one of the MSU's of the system shown in FIG. 1.

Referring next to FIG. 6 there is shown the microprocessor and timing unit 18 divided into two groups of circuits which can be contained on separate printed wiring boards. One of these groups 92 contains a microprocessor chip 94 and circuits 96 for monitoring generating and switchover of the timing signals (the clock and sync signals). Also associated with the microprocessor (MPU) 94 is the MSU encoder 98 which translates the code provided for on the MSU identification lines into a three-bit ID code for the particular MSU, whether it be MSU-0, MSU-1 or any of the other eight MSU's.

A control signal interface 100 connects the MPU 94 with the control signal data link. This data link is a serial link for carrying control signal data between the MSU's and a line indicating whether or not the serial link is busy (the link busy line). The control signal interface and the encoder are described in greater detail hereinafter in connection with FIG. 8. The clock and sync signals are generated in each MSU by the circuits described above which are found in the monitoring generating and switch-over circuits 96. Each of these circuits is connected in a chain via CHIN and CHOUT lines. The CHIN line is connected to the CHOUT line of the preceding MSU and the CHOUT line is connected as the CHIN line for the succeeding MSU. Over these lines there is transmitted signals indicating whether or not the timing signals generated in a preceding MSU or in the particular MSU are valid. These validity signals control the switchover circuits which switch over to the clock and sync signal generators in the particular MSU if the signals from the preceding MSU's are not valid as indicated by a signal on the CHIN line thereto. The timing signals, monitoring generating and switchover circuits 96 are the subject matter of the abovereferenced application filed concurrently herewith in the name of Charles J. Breidenstein, Jerome S. Caplan, and Bruce Littlefield.

The MPU may be a commercial microprocessor chip such as the type 6803 which is manufactured by Motorola. The inputs to this chip are the identity code, received data signals on the RCV line from the interface 100, acknowledge (ACK) signals from the interface 100 indicating that the serial link is available for transmission of data from the MPU via the transmit (XMIT) line and a data BUS on eight lines (D-BUS). The D-BUS also provides inputs to the MPU 94. Other outputs from the MPU are 16 address lines along an address BUS-(AD-BUS). Eight of these lines are data BUS lines which are time shared for data and address signals.

The MPU provides an address strobe output (AS) which allows for the dual use of the data lines as address lines. When the AS signal is present address signals on the lower order address lines may be latched in buffer registers (not shown) associated with the MPU and the same lines used for the data BUS. The AS line may also be used in providing timing signals to the memory 102 which is part of the processor 18. Also applied to the memory are the $\phi 2$ and the R/$\overline{\text{W}}$ lines which were described in connection with FIG. 4. The $\phi 2$ signal is a sync signal generated in the MPU when the addresses are all valid. This enables the withdrawal of inhibition of the tri-state or high impedance condition on the inputs to the memory. It is really a signal which says when the data is valid on the D-BUS for addresses and for data. There can be no reading or writing with respect to the memory until addresses are valid. The $\phi 2$ signal assists in timing of the operation of the memory and also in the operation of the time slot interchange 16 and the registers 44, 46, 50 and 52 of the port and service circuits 12 and 14 by insuring that they do not transmit or receive data except at the appropriate time during each MPU cycle. The R/$\overline{\text{W}}$ signal line is high for reading and low to enable writing into the memory 102.

The memory consists of a main storage unit which may have several thousand addresses of read-only memory, as well as random access memory in say 2,048 addresses. The data BUS is connected to the memory. If the memory or any other devices in the system are not being addressed, they remain tri-stated on the BUS; that is, in their high impedance state. In other words, if a chip such as a memory chip is not enabled, the chip will automatically tri-state. Accordingly, the same line can serve several chips and logic units of the system. The data BUS is also connected to the line slot interchange, as explained in connection with FIG. 4, for providing information as to the sending port or service circuit. The data BUS is also connected to the registers of the port and service circuits 12 and 14, both for initializing these registers to store identification data and for extracting or supplying information as to port events (e.g., off-hook, ringing, or digit codes).

The main storage 104 receives its addresses through decoders 106 which select only those addresses on the address BUS allocated to the main storage. Other addresses allocated to the port and service circuits are obtained from buffer registers and decoders 108 which allocate them between the registers of the port and service circuits 12 and 14 and the time slot interchange 16. The decoders also obtain a port and service circuit enable output which prevent the registers of these circuits from responding to addresses unless intended for the port and service circuits.

Similarly, a TSI enable output is provided by the decoders 108 to the time slot interchange so that the time slot interchange is not allowed to respond to the addresses unless communication with the MPU 94 is called for. The TSI enable operates within the time slot interchange as was explained in connection with FIG. 4. The buffer registers also buffer the $\phi 2$ and R/$\overline{\text{W}}$ signal and these signals, after being buffered, are applied to the registers of the port and service circuits 12 and 14 and to the time slot interchange 16.

Another input to the MPU 94 from the port and service circuit codec is an IRQ or interrupt request. This request is a signal generated only by some port and service circuits such as an attendant console, which must have a quick response by the system to activation. For example, when a key on an attendant console is depressed the system should immediately enter a subroutine to check out those ports and service circuits which can issue the interrupt request. As an example, a tone receiver circuit may provide an IRQ. When a service circuit which has a tone set is scanned and provides data to the MPU 94 that it is off-hook, a connect through the time slot interchange to a tone receiver is established. An IRQ is provided by the tone receiver to the MPU 94. The data from the tone receiver then immediately is read by the MPU to input the digits of the receiving port which is being dialed.

Figure 7:
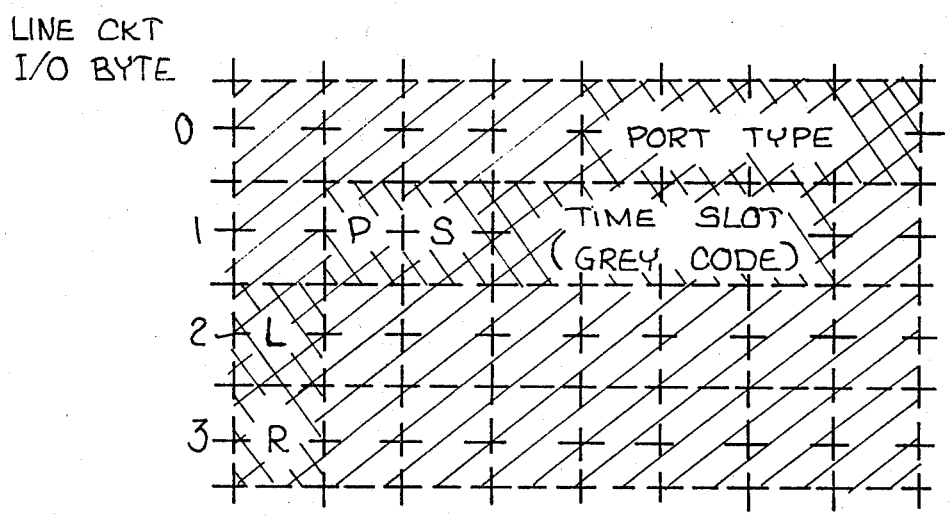
FIG. 7 is a memory map of the registers in the port and service circuits of the MSU's shown in FIG. 6.

As was explained in connection with the time slot interchange (FIG. 4) the port and service circuits and their codecs are connected via the PS highway and the SS highway to the time slot interchange 16 and then to the time slot interchanges of the other MSU's. The PR highway and SR highway are connected within the port and service circuits 12 and 14 to the registers 44, 46, 48 and 50. These registers also have storage locations for the port and service circuit identification code (port type), and for the time slot identification in Gray code. As mentioned above these codes are assigned over the MPU data BUS upon initialization of the system. Each port or service board may for example have 32 bytes of addressable space. Four of these bytes are shown in FIG. 7. The port type is hardwired in the first byte positions (the byte "0" position). This may be hardwired on the particular port and service circuit board and identifies special lines for special types of service circuits (e.g., tone receivers, tone plants, attendant consoles and the like) which are contained on the particular port and service circuit board. The next byte position (byte 1) has storage for information as to whether this particular circuit is to use the port or service highway. It also has storage for the time slot in a Gray code which is assigned to the particular port or service circuit.

This time slot assignment is made by the MPU upon initialization (power up) by addressing the registers in the port and service circuits and writing the appropriate Gray code therein. A port service board position comparator 110 is used. The board position identification lines (4 bits) are read from the back plane of the main frame in which the port and service printed wiring boards are mounted. The comparison between the four bits from the ID lines and four bits of the address from the MPU enables writing of the time slot assignment Gray codes into the registers. A table is set up in the main storage RAM 104 for each line and service circuit. This table provides a map of the assignments. The MSU scans the registers and has access to each port and service circuit in accordance with the assignment information in its main storage 104.

The registers of the line circuit ports also have bytes such as bytes in positions 3 and 4 for bits indicated as L and R bits. The L bit gives the present loop status. When L is "0" it indicates that the port if off-hook. When L is "1" it indicates the port being on-hook. R is another bit which controls the application of ringing voltage to the line. Setting R equals 0 applies continuous ringing voltage and setting R equals 1 removes ringing voltage. Similarly, other data as to digits dialed may be derived from the L bit (the state of the L bit) and transferred to the MPU for processing in order to establish calls from or to the port or service circuits associated with the particular MPU. The data regarding the port or service circuit which is sending and the port or service circuit which is receiving can be transmitted along the serial link to the other MPU's of the other MSU's. Of course, if a call is directed to a port and service circuit in the same MSU the data and addresses are internally generated in the MPU 94 to establish bidirectional communications between the ports and service circuits requesting interconnections.

Figure 8A:
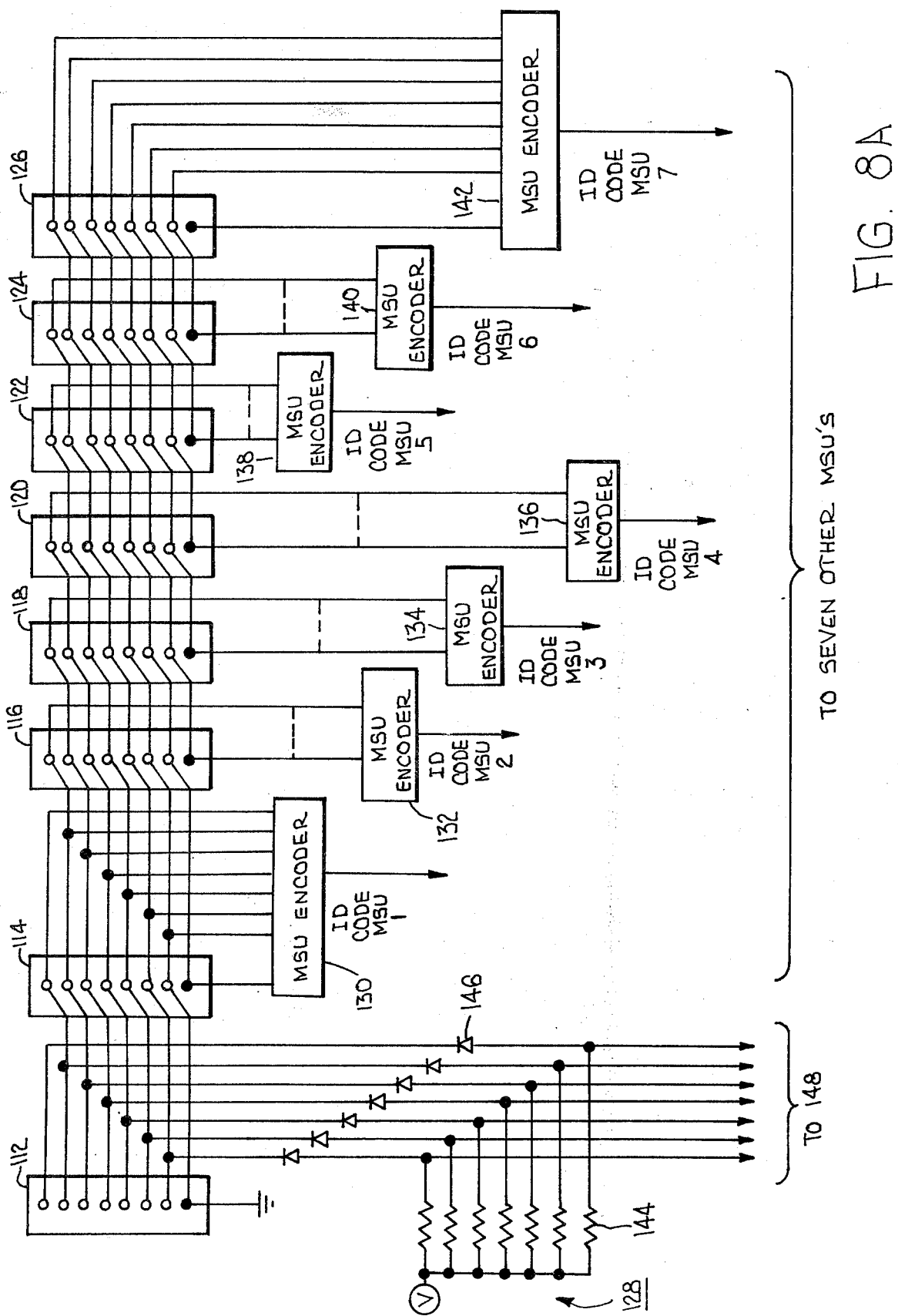
FIG. 8 (A and B) is a block diagram showing the interfaces between the lines interconnecting the MSU's, and particularly the circuitry for identifying a particular MSU and interfacing the control signals to the microprocessors thereof.
Figure 8B:
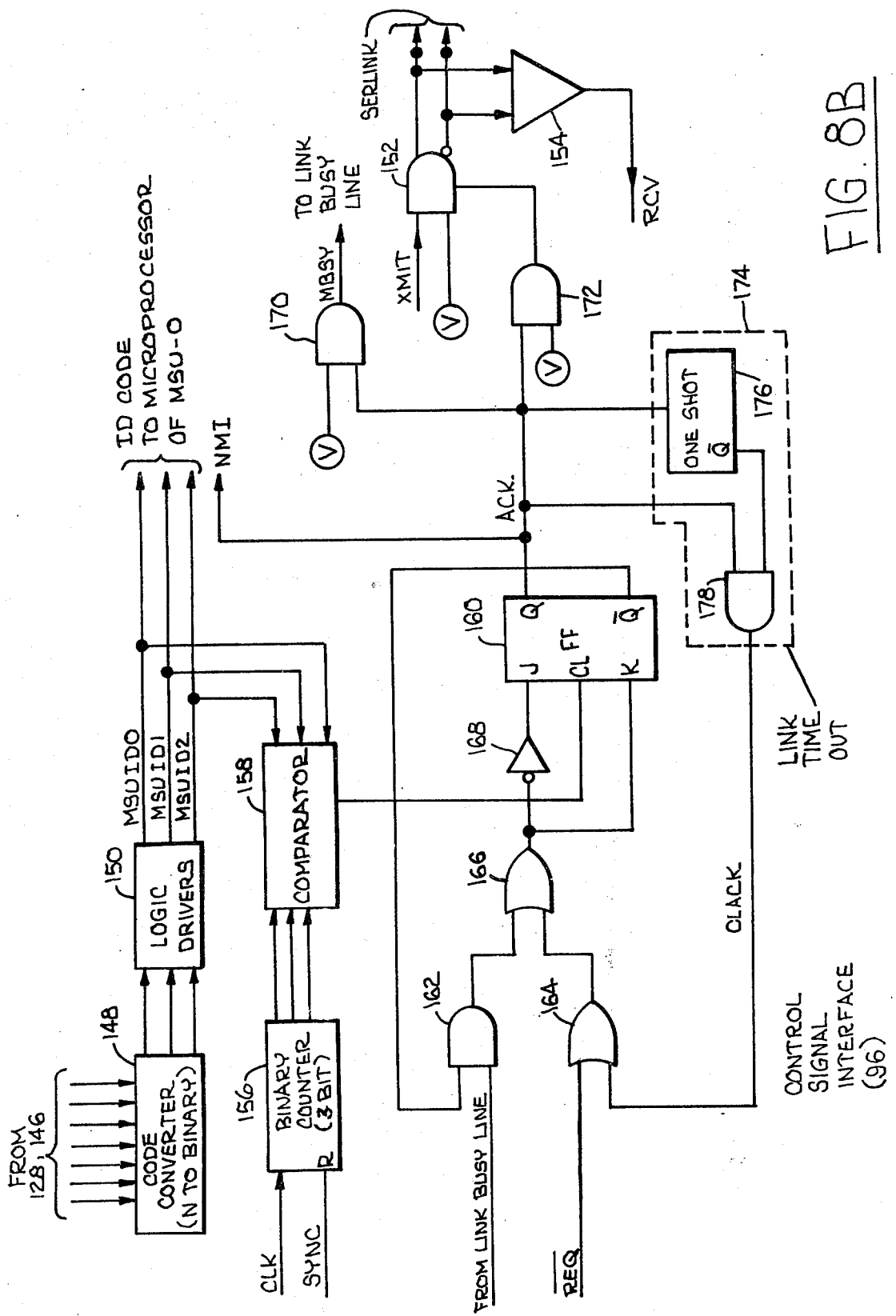

Arrangements of the MSU encoders 98 in the system 10 and the operation of the control signal interface 100 will be more apparent from FIG. 8A. The MSU identity lines run between eight connectors 112, 114, 116, 118, 120, 122, 124 and 126. These connectors may be disposed at any position or station along the line where the MSU's may be connected. Each connector has the same number of terminals which is equal to the maximum number of MSU's in the system, in this case eight. The terminals are ordered or spaced next to each other. One of the terminals, for convenience the lowest one in the order, is indicated by a solid dot. The others are indicated by open circles. The solid dot connotes that the terminal is grounded to the logic ground of the system. The identification lines are shifted by one terminal position in the interconnections between the terminals. In this way the lowest terminal of connector 112 is connected to the second terminal of connector 114, the third terminal of connector 116, the fourth terminal of connector 118, the fifth terminal of connector 120, the sixth terminal of connector 122, the seventh terminal of connector 124 and the eighth terminal of connector 126. The ground is distributed to these terminals by reason of the connection of ground to the first terminal of connector 112. Accordingly, by virtue of this connection, the first terminal of the first connector 112 will be grounded, the first and second terminals of the second connector 114 will be grounded, the first, second and third terminals of the third connector 116 will be grounded, until in the last connector 126 all terminals will be grounded. Thus a code depending upon the number of grounded terminals is developed which is used to provide the identification code for each MSU.

When the MSU is connected in connector 112, it will be automatically identified as MSU-0. If the MSU is connected in connector 114, then it will be identified as MUS-1, and so forth. This provides for modularity among the MSU's and flexibility as to where they may be used in the system, without the need for manual strapping at installation time.

The ungrounded terminals of each connector are maintained at relatively high potential. This is carried out in each of the MSU encoders. The MSU encoder 128 for MSU-0 is shown in detail and exemplifies the encoders 130 through 142 for the other seven MSU's. A source of voltage, indicated as V, is connected through resistors 144 and diodes 146 to each terminal of the connector 112. The diodes 146 prevent sneak current paths to the identification lines to a code converter 148. In the encoder 128 the code converter will have all high voltage levels applied to the inputs thereof since none of the seven inputs thereto are grounded. In the case of the encoder 130, the input corresponding to the second terminal of the connector is grounded. In the case of the encoder 132 the second and third inputs are grounded. This is encoded into a three-bit binary coded signal in the converter 148 (see FIG. 8B). The signal is raised to logic level in logic drivers 150 which provide the MSU, ID0, MSU ID1 and MSU ID2 bits in binary code. These bits are applied to the ID code input of the MPU in MSU-0. Similar identification codes which are all different binary numbers representing 0 through 7 numerically, are inputted to the MPU's of each of the other seven MSU's.

The ID code is also used in the control signal interface 96. This interface provides for orderly access for the transmission of control data signals on to the serial link (SERLINK). The serial link is a differential pair of lines which is driven by the transmit (XMIT) line from the MPU through a driver 152. A receiver 154 is always connected to the serial link so that the MPU may always listen and receive control data signals therefrom along the RCV lines. Round robin access to the serial link for transmission purposes is possible, being granted only at the time slot allocated to the particular MSU for transmission. Once transmission starts the MSU retains the link until the transmission is completed and the request for access to the link on the line containing the request link command (REQ) indicates that access to the link is no longer required. However, access to the link is not possible if the link is busy. This function is provided for by a link busy line, and a binary counter 156 which may be a three-bit binary counter which is reset by the sync pulse and counts the clock pulses. The counter automatically recycles after counting eight clock pulses. The sync reset insures that the counters will be in time synchronism in each MSU.

The three lowest order output bits of the counter are applied to a comparator 158 for comparison therein with the MSU ID code. Accordingly, the comparator 158 will output a pulse once during each cycle of eight clock pulses which is counted by the counter 156. This pulse is used to set a flip-flop 160, but only when the link is not busy and a request for access to the link has been generated. The request is indicated by the $\overline{REQ}$ line going to a logic low level. The link busy line and the $\overline{REQ}$ level line are connected to trigger the flip-flop 160 through an AND gate 162 and two OR gates 164 and 166. The output of the OR gate 166 must be low in order to set the flip-flop 160, since this output is applied to the J input of the flip-flop 160 through an inverting driver 168. The flip-flop is initially cleared. Accordingly, if the link is busy, the AND gate 162 is enabled and the logic level at the output of the OR gate 166 is high. The flip-flop therefore is never set if the link is busy. If the MSU does not request access to the line, the $\overline{REQ}$ line is high and the output of the OR gate 166 is similarly high also preventing the flip-flop 160 from being set. If the link is not busy and a request has been entered, the flip-flop 160 does set and issues an acknowledge level (ACK) which is transmitted to the MPU as an NMI (non-maskable interrupt) signal. The MPU then begins to transmit into the serial link. The ACK level also enables an AND gate 170 to output a signal (MBSY) to the link busy line so that no other MSU can have access to the line while MSU-0 is transmitting.

The presence of an acknowledge level on the ACK line also enables another AND gate 172, which in turn enables the driver on the transmit line from the MPU of MSU-0. The line now transmits control data signals from MSU-0. MSU-0 will retain the link until the $\overline{\text{REQ}}$ level goes high or link time-out occurs as described below and the next time slot for the MSU-0 occurs so that the flip-flop 160 can be clocked into its reset state.

A link time-out circuit 174 is provided by a one-shot 176 and an AND gate 178. Once the flip-flop 160 is set and the ACK line goes high, the $\overline{\text{Q}}$ output of the one-shot 176 and the AND gate 178 will remain low for the time-out period of the one shot 176 unless $\overline{\text{REQ}}$ is removed prior to time out. When time-out occurs the output of AND gate 178 goes high. The positive level will propagate through the OR gates 164 and 166 and a low level will be applied to the J input while a high level will be applied to the K input of the flip-flop 160. The flip-flop 160 will reset on the next compare output from the comparator 158. Accordingly, the system in the control signal interface assures access to the link and releasing of the link without conflict among the MSU's. Accordingly, the system in the control signal interface assures access to the link and releasing of the link without conflict among the MSU's.

The operation of the system will be apparent from the following example of the establishment of a call between ports which are connected to rotary dial telephones. Consider that a line goes off-hook. As each port is addressed successively, which will be referred to as scanning, the registers 46 exhibit an L bit which changes from "1" (on-hook) to "0" (off-hook) (see FIG. 7), and this is recognized as an event by the MPU 94. The calling like state (a number stored in main storage 104) advances to a new state and a timer, (a number stored in main storage 104) is started. Unless the calling line "L" bit returns to a "1", a timeout occurs. This event results in the MPU advancing the state of the calling line to a dial tone state. The MPU also directs the time slot interchange 16 to establish a voice connection from a service circuit which generates dial tone to the calling line. Dial tone is heard.

Now the calling line begins dialing. As the dial returns to normal, the L bit of the calling line's register 46 will change from "0" to "1" and back to "0" a number of times equal to the digit dialed. The scanning process in the MPU 94 detects these changes in the L bit and these are recognized as events. The first such event ("0" to "1" or off-hook to on-hook) serves to advance the state (in main storage 104) to a "break" dialing state, and the TSI is directed to apply a "silent tone" to the calling line. The MPU also clears a pulse count stored in main storage 104. Dial tone is no longer heard.

The next event, the "1" to "0" or on-hook to off-hook transition, causes the MPU to count a dial pulse (which is stored in main storage 104) and advances the state to a "make" dialing state as well as initiate another timer (also stored in main storage 104). A subsequent "0" to "1" event will advance the state back to the "break" dialing state unless this timer expires. The timer will not expire during the relatively short make periods between dial pulses, so that the state of the calling line will alternate between the "break" and "make" dialing states during the dialing of a digit, resulting in the dial pulse count equaling the value of the dialed digit. At the end of the digit, the timer will expire before the "0" to "1" transition for the first pulse of the next digit is detected. This timer expiration from the "make" dialing state signals the end of a digit which is then stored by the MPU 94 in main storage 104. In this way the digits of the called number are accumulated. After the first digit is dialed, reference is made to translation tables stored in main storage 104 to ascertain the number of digits to be expected in the called number based on the first digit. After each digit is received, MPU 94 checks if the expected number of digits have been received. If not, the pulse count is cleared, and the dialing states continue. If a complete telephone number has been registered, translation routines in MPU 94, using tables stored in main memory 104, determine that this is a local line (i.e. in this example, a call between two lines connected to the same system is assumed). At this point, it is not known in which of the up to 8 units the called line is located.

In keeping with the distributed control concept, each unit is responsible for its own ports exclusively. Since the MPU 94 associated with the calling line has determined that this is a local call, it issues a request (REQ) for the serial link via control signal interface 100, in order to send a message to all the units (including itself) to "seize and ring line XXXX", where XXXX represents the dialed station number. When the link is available to this MPU, the control signal interface 100 assigns the link, marks it busy to other units, and generates ACK which alerts the MPU via an interrupt that it can begin transmission of the message. The MPU, which will be referred to as the "ing" MPU, then transmits its message, which is received by all units on an interrupt basis via their respective control signal interfaces 100. The calling line is then advanced to await ring state.

Each unit's MPU 94 then processes this message by comparing the station number received with its list of station numbers contained in its translation tables located in its main storage 104. By design, only one unit in the system will have a matching line number, and its MPU 94, which will be referred to as the "ed" MPU, responds to this message by advancing the state of the called line (assuming it is idle) from the idle state to the ring line state. It also addresses the corresponding register 46 and sets the R bit to 0, which causes ringing current to be applied to the called line, and also requests the use of the serial link in a manner similar to the aforementioned message protocol, except that the message "success on seizing line XXXX" is sent. This message also includes the identity of the 'ing' MPU, so that others can ignore the message.

With the called ling ringing, it is now necessary to provide audible ring back tone to the caller. This is accomplished when the "success on seizing line XXXX" message is received, whereupon the 'ing' MPU 94 advances the calling line state to awaiting answer state, and directs the timeslot interchange to establish a path from a service circuit which provides ring back tone to the calling line.

In both the calling line's awaiting answer state, and the called line's ring line state, timers are active. When these timers expire, the resulting events cause the associated MPUs 94 to remove ringing in the case of the 'ed' line, and remove ringback tone (by substituting silent tone) in the case of the 'ing' line. Timers are then initiated again, but their expiration will re-establish ringing and ringback tone respectively. These cycles repeat until the called party answers.

The called line's unit also has a scanning process similar to the aforementioned. When the called line answers, its scanner routine detects this event, which results in the 'ed' MPU establishing, via its associated time slot interchange 16, a path to the called line from the calling line, removing ringing by setting the R bit to 1, and the transmission of a message to the 'ing' MPU 94 in a manner similar to the previous messages. The called line state advances from ring line to talking line-to-line.

This message, "Line XXXX has answered" is received by the 'ing MPU 94, and results in removal of ringback tone and establishment of a receive path from the called to the calling line via commands to timeslot interchange 16 from 'ing MPU 94. The calling line state advances from await answer to talking line-to-line.

The parties converse. The associated MPU 94 supervises its half of the connection by scanning the respective port ('ing or 'ed'). When the parties disconnect at the end of the call, the respective scanning processes in the MPUs 94 detect the change in state of the L bits in registers 46 from "0" to "1", and start timers. The timeout of these timers indicates a valid release, and causes each MPU 94 to assign, via its respective timeslot interchange 16, silent tone to the associated line, and set the states back to idle state.

We claim:

1. A time division switching system for providing two-way communication between a plurality of circuits arranged in a plurality of groups, said system comprising a time slot interchange having a plurality of groups of memory sections each corresponding to at least one of said circuit groups, said memory sections each having a plurality of memory locations each corresponding to a different one of the sequential time slots of the plurality of circuits in its corresponding circuit group, a plurality of send highways between said corresponding circuit group and memory section group, a plurality of receive highways each for a separate one of said circuit groups, means for connecting each of said receive highways selectively to any of said memory sections, timing and control means for transmitting data signals simultaneously in each of said time slots along said send highways from all of said circuit groups to said memory sections for storage in different ones of said plurality of locations and for transferring data signals stored in said locations selectively to different ones of said receive highways to the circuit group therefor through said connecting means in different ones of said time slots to provide bidirectional communications among any of said circuits in the same circuit group and in different ones of said circuit groups.

2. The invention as set forth in claim 1 further comprising at least a second plurality of circuits arranged in a plurality of second groups, which share sequential time slots occurring synchronously with the time slots for said first plurality of circuits, a second time slot interchange having a plurality of memory sections each corresponding to at least one of said second circuit groups and to at least one of the first circuit groups of the first plurality of circuits, said second memory sections also each having a plurality of memory locations each corresponding to a different one of said sequential time slots, the first time slot interchange also having memory sections corresponding to at least one of said second circuit groups, a second plurality of send highways between corresponding second circuit groups and memory sections of said second time slot interchange, said second send highways also being connected to said memory sections in said first time slot interchange corresponding thereto, said first send highways also being connected to the memory sections of said second time slot interchange corresponding thereto, a second plurality of receive highways each for a separate one of said second circuit groups, second means for connecting each of said second receive highways to any of said memory sections of said second time slot interchange, said means for selectively connecting said first mentioned receive highways to said memory sections of said first time slot interchange also being for connecting said first mentioned receive highways to said memory sections of said first time slot interchange corresponding to said second circuit groups, second timing and control means for transmitting data signals along said send highways to said memory sections of said second interchange for storage in different ones of said plurality of locations therein and for transferring data signals stored in said locations therein to different ones of said second receive highways through said second connecting means, and said first and second control and timing means having direct connections for control and timing signals therebetween.

3. The invention as set forth in claim 1 wherein said plurality of groups of circuits comprise a first group of circuits and a second group of circuits for sending and receiving digital signals, said plurality of groups of memory sections comprise first and second memory section groups, said first memory section group having first and second memory sections corresponding to said first and second group of circuits, respectively, said second memory section group having third and fourth memory sections corresponding to said first and second group of circuits, respectively, said plurality of send highways comprise a first send highway between said first circuit group and said first and third memory sections, a second send highway between said second circuit group and said second and third memory sections, said plurality of receive highways comprise a first receive highway for said first circuit group and a second receive highway for said second circuit group, said connecting means comprise first and second switch means for connecting said first and second memory sections selectively to said first receive highway and said third and fourth memory sections selectively to said second receive highway.

4. The invention as set forth in claim 3 wherein said first circuit group consists of a plurality of port circuits for telephone lines not exceeding in number the number of said sequential time slots in a sequential frame of said slots and said plurality of service circuits in number not exceeding said number of said time slots.

5. The invention as set forth in claim 1 wherein said timing and control means for sequentially providing first digital control signals representing the locations in said group of memory sections containing data from the ones of said circuits which are sending and second digital control signals representing the ones of said circuits which are receiving, and means responsive to said second control signals for reading said data signals stored in said groups of memory sections in the locations represented by said first signals onto said receive highways in time slots allocated to said receiving circuits.

6. The invention as set forth in claim 5 wherein said means for reading onto said receive highways comprises a random access memory having storage for said first control signals in a plurality of locations equal in number to the number of said plurality of locations in each of said groups of memory sections, register means for storing successive ones of said first control signals, means operated by said second control signals for transferring said first control signals successively from selected locations in said random access memory to said register means, and said register means being connected to said memory groups and to said connecting means for reading out said memory group locations for reading out said locations onto said receive highway.

7. The invention as set forth in claim 6 wherein said reading out means comprises a counter operative synchronously with the occurrence of said time slots, for sequentially providing first signals representing different ones of said random access memory locations, means for applying said first data signals to said random access memory locations represented by said counter signals, means responsive to second signals from said counter for timing the transfer of said first control signals to said register, said counter also providing third signals for transferring said data signals from said send highways into said memory section locations.

8. The invention as set forth in claim 7 further comprising means for generating fourth signals from said counter and applying said fourth signals to said circuits for successively enabling said circuits in each of said groups to transmit said data signals onto said second highways and receive said signals from said receive highways.

9. The invention as set forth in claim 8 wherein said fourth signal generating means comprises means for converting a plurality of the outputs of said counter into a multi-bit signal in accordance with a Gray code, said Gray code signal being said fourth signal.

10. The invention as set forth in claim 9 wherein said converting means comprises means for delaying said fourth signal the period of one time slot which comprises an adder connected to said counter for adding an integer to the number represented by the outputs of said counter, a Gray code converter, and applying a plurality of higher order bits represented by the outputs of said adder to said converter to provide said Gray code signal.

11. A TDM telecommunications system for providing two-way communications between a plurality of lines, said system comprising a plurality of switching units each serving a separate group of said lines, each of said units having port means interfacing with said lines for receiving and transmitting digital signals, time slot interchange means, and processor means, a send highway and a receive highway, said time slot interchange means, processor means and port means interfacing with each other to provide time division multiplexed receiving connections for digital signals through said time slot interchange means and receive highway, and time division multiplexed transmitting connections along said send highways to said time slot interchange means, and said switching units being in direct communication with each other via control lines interconnecting the processors thereof and said send highways interconnecting the time slot interchanges thereof.

12. The invention as set forth in claim 11 wherein each of said switching units further comprises a plurality of service circuits, a service send highway and a service receive highway, said service circuits having means for transmitting and receiving digital signals, said time slot interchange means, processor means and service circuit means interfacing with each other to provide time division multiplexed receiving connections for digital signals from said port means and service circuits in every one of said plurality of switching units through said service receive highway and to provide time division multiplexed transmitting connections along said service send highway to said time slot interchange means, and said switching units also being in direct communication with each other via said service send highways interconnecting the time slot interchanges thereof.

13. The invention as set forth in claim 12 wherein each of said time slot interchanges of each of said units has memory means with a separate group of digital signal storage locations for each of said port means send highways, and said service send highways, timing means for reading said digital signals from said port and service send highways in synchronism into said locations in its respective one of said groups of locations in said memory means.

14. The invention as set forth in claim 13 wherein said memory means comprises a pair of memories each having a pair of said groups of locations with one of said pair of groups providing storage for the digital signals from said port send highways and the other of said pair of groups providing storage for the digital signals from said service send highways, one of said pairs of groups being connected to said service receive highway of said unit and the other of said pair of groups being connected to said port receive highway of said unit.

15. The invention as set forth in claim 11 wherein said time slot interchange has a memory means providing a separate group of locations for each send highway from each switching unit, and timing means for writing said multiplexed digital signals from each said send highways in corresponding time slots simultaneously into each said groups of locations.

16. The invention as set forth in claim 15 wherein said processor means includes timing signal generating means, and said control lines include lines carrying timing signals generated by said timing signal generating means in one of said units to all of said units such that all of said units are operated synchronously in response to said timing signals.

17. The invention as set forth in claim 11 wherein said control lines include identification lines having means for providing different identification code outputs at a plurality of different positions therealong, said units being connected to said identification lines each at a different one of said positions, and means in the processor means of each of said units for deriving said different identification code outputs depending upon the one of said positions to which each said unit is connected.

18. The invention as set forth in claim 17 wherein said connections are provided at a plurality of connectors spaced successively along said identification lines, said connectors having a plurality of terminals at least equal in number to the number of switching units in said plurality of units, said lines being connected in staggered relationship to said terminals with one of said lines being connected to terminals in all of said connectors which are successively offset, the next of said lines connected to terminals in one less than all of said connectors which are successively offset from each other and from the terminals to which said one line is connected, and so forth, means for connecting a like positioned one of said terminals on each of said connectors to a reference potential, and said identification code deriving means being connected to the terminals of said connectors other than said one of said terminals.

19. The invention as set forth in claim 17 wherein said control lines also include a link line for carrying control data signals, a line for carrying timing signals and a line for carrying signals indicating that said link line is busy, means in each said processor means responsive to the identification code thereof for successively providing access to said link line for transmitting said control data signal from said processor means thereon in the absence of a busy condition signal being carried on said link busy line.

20. The invention as set forth in claim 19 wherein said means for successively providing access to said link line for transmitting control data signals comprises a counter for counting said timing signal for providing a code which changes successively, means responsive to said identification code and said counter code for providing an output in a different one of a plurality of successive periods of time for enabling access to be had to said link line, and means responsive to a request for access to said lines and said link busy line condition for providing access to said line upon occurrence of said output.

* * * * *